United States Patent [19]
Maniwa et al.

[11] Patent Number: 5,731,879
[45] Date of Patent: Mar. 24, 1998

[54] SIMPLEX/DUPLEX IMAGE FORMING APPARATUS WITH DOCUMENT MEMORY

[75] Inventors: Yoshio Maniwa, Yokohama; Ikuo Okumura, Zama; Yoshikazu Itoh, Yokohama, all of Japan

[73] Assignee: Ricoh Company, Ltd., Tokyo, Japan

[21] Appl. No.: 628,939

[22] Filed: Apr. 8, 1996

[30] Foreign Application Priority Data

Apr. 10, 1995 [JP] Japan ................................. 7-084056

[51] Int. Cl.[6] ..................................................... H04N 1/21
[52] U.S. Cl. ........................... 358/296; 358/401; 358/444; 355/23
[58] Field of Search ........................ 358/296, 401, 358/444, 468, 498; 395/116; 355/23, 24; 399/309, 364, 374, 404, 410

[56] References Cited

U.S. PATENT DOCUMENTS

| | | | |
|---|---|---|---|
| 4,757,349 | 7/1988 | Rourke et al. | 355/6 |
| 4,763,167 | 8/1988 | Watanabe et al. | 355/14 R |
| 4,866,487 | 9/1989 | Ohuchi et al. | 355/313 |
| 4,910,612 | 3/1990 | Yamakazi | 358/496 |
| 4,990,941 | 2/1991 | Kawai | 346/153.1 |
| 5,206,684 | 4/1993 | Wada et al. | 355/203 |
| 5,210,823 | 5/1993 | Moroi | 395/116 |
| 5,227,816 | 7/1993 | Forest | 346/160 |
| 5,243,439 | 9/1993 | Jacobus et al. | 358/448 |
| 5,512,996 | 4/1996 | Fare | 355/322 |
| 5,557,390 | 9/1996 | Ito et al. | 355/319 |

FOREIGN PATENT DOCUMENTS

| | | |
|---|---|---|
| 63-247041 | 4/1987 | Japan . |
| 63-283968 | 5/1987 | Japan . |
| 2-20880 | 12/1987 | Japan . |
| 2-272465 | 4/1989 | Japan . |
| 4-334466 | 5/1991 | Japan . |
| 5-38865 | 2/1993 | Japan . |
| 61-176955 | 1/1995 | Japan . |
| 61-186969 | 2/1995 | Japan . |

*Primary Examiner*—Peter S. Wong
*Assistant Examiner*—Gregory Toatley
*Attorney, Agent, or Firm*—Lowe, Price, LeBlanc & Becker

[57] ABSTRACT

When an image is formed on one surface of each sheet of printing paper, the controller provides controls so that image data for all pages is stored in the HDD, and the image data stored in the HDD is successively converted to actual images from the final page by the drum with the printed sheets discharged onto the discharged paper tray. When image are formed on duplex surfaces of each sheet of printing paper, the controller provides controls so that image data for only odd number pages is stored in the HDD, image data for odd number pages is successively converted by the drum to actual images in the regular order with the printed sheets stacked on the duplex tray, and the sheets stacked on the duplex tray are successively fed from the top one to the drum with the image data for odd number pages stored in the HDD converted to actual images by the drum in the reverse page order with the printed sheets discharged onto the discharged paper tray.

44 Claims, 12 Drawing Sheets

FIG. 5

| TYPE OF JOB | AVERAGE DATA RATE | MAXIMUM MEMORY PAGE | MAXIMUM REQUIRED CAPACITY |
|---|---|---|---|
| PRINT BUFFER | 200K BYTES/PAGE | AT LEAST 100 PAGES | 20MB |
| FONT BUFFER | 200K BYTES/FONT | AT LEAST 500 FONTS | 100MB |
| G3-FAX TRANSMISSION BUFFER | 100K BYTES/PAGE | AT LEAST 500 PAGES | 50MB |
| G3-FAX RECEIVING BUFFER | 100K BYTES/PAGE | AT LEAST 500 PAGES | 50MB |
| SCAN BUFFER 1 | 400K BYTES/PAGE | AT LEAST 500 PAGES | 200MB |
| SCAN BUFFER 2 | 3.2K BYTES/PAGE | AT LEAST 60 PAGES | |
| OTHERS | | | |
| SUM TOTAL | | | |

NOTE 1: AVERAGE COMPRESSION RATE OF IMAGE DATA IS 1/5
NOTE 2: SCAN BUFFER 1 MEANS 1-BIT DATA, SCAN BUFFER 2 MEANS 8-BIT DATE

FIG.6
(1) FACE-UP PAPER PATH
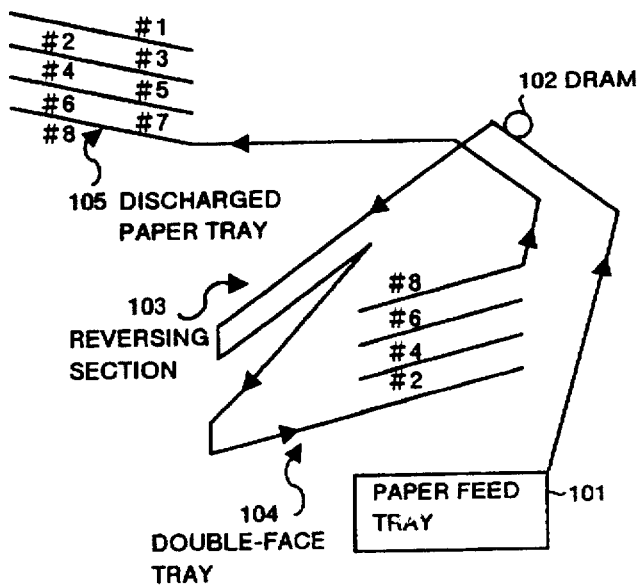
(2) FACE-DOWN PAPER PATH
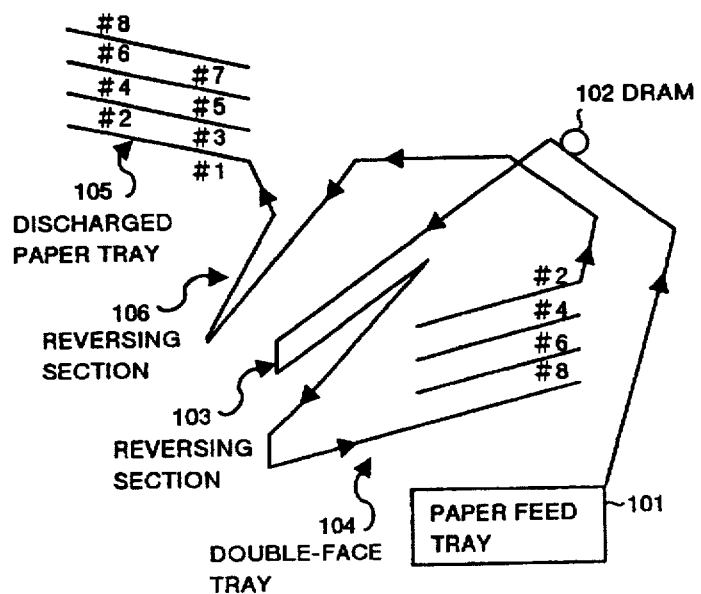

FIG. 10
(1) POSITION FOR STAPLING
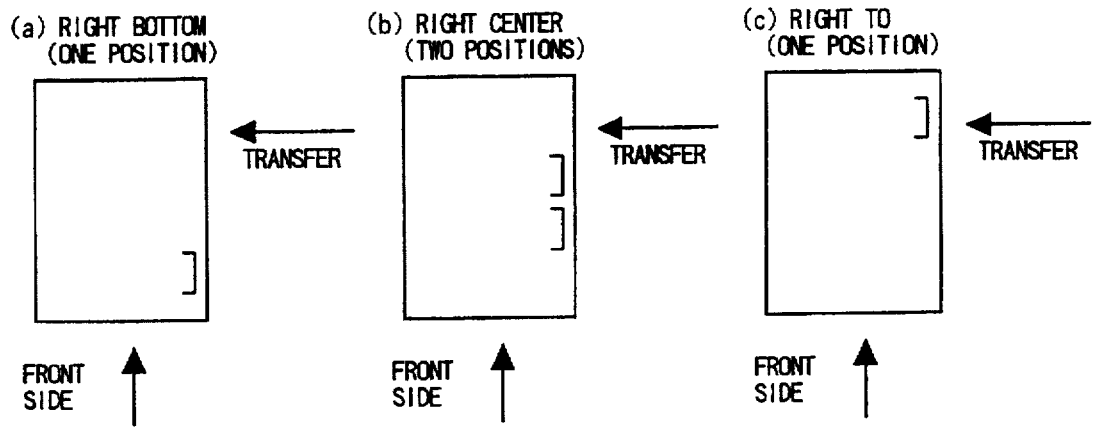
(2) A4 / LETTER SIZE
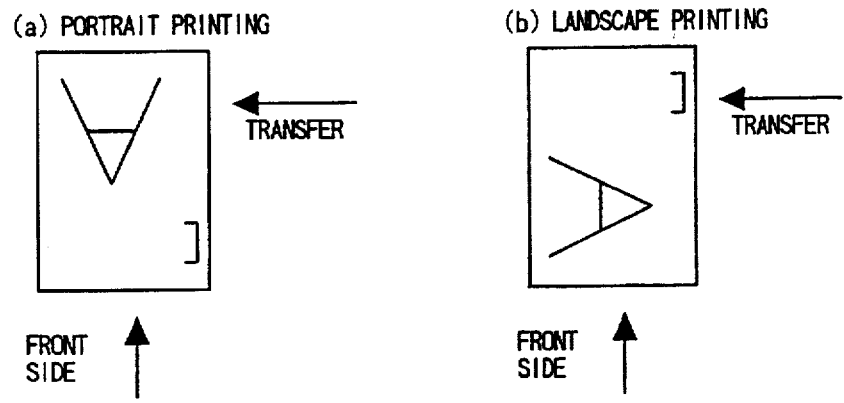
(3) A3 / DOUBLE-LETTER SIZE
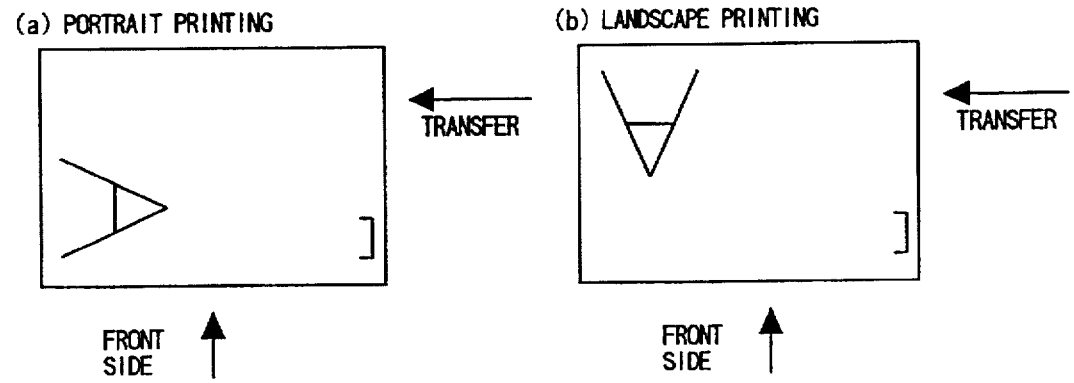

FIG. 11
(1) CASE OF LONGITUDINAL TRANSFER
(a) PORTRAIT PRINTING
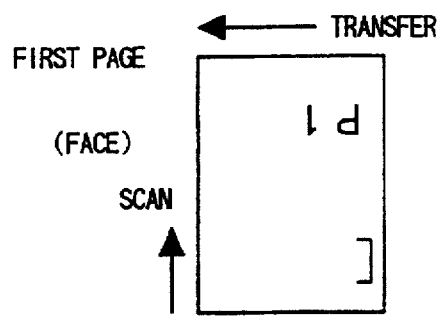
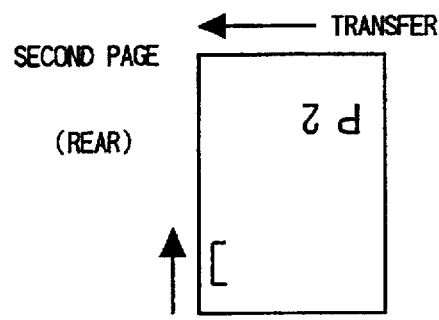
(b) LANDSCAPE PRINTING
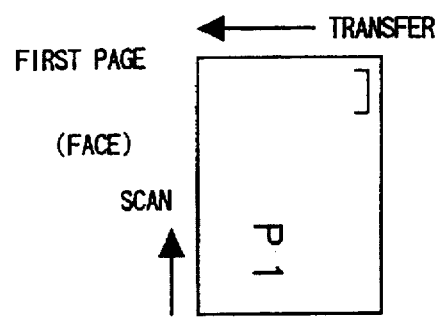
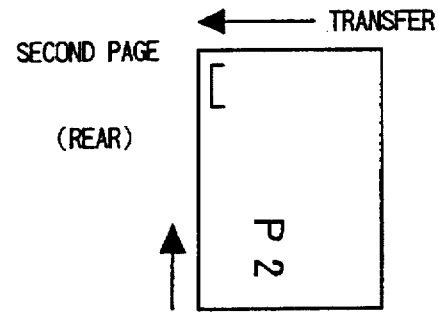
(2) CASE OF LATERAL TRANSFER
(a) PORTRAIT PRINTING
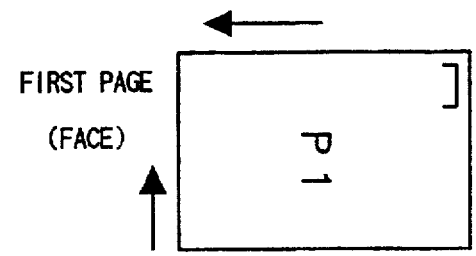
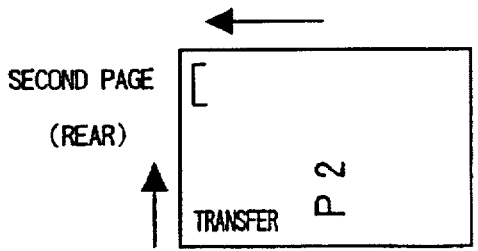
(b) LANDSCAPE PRINTING
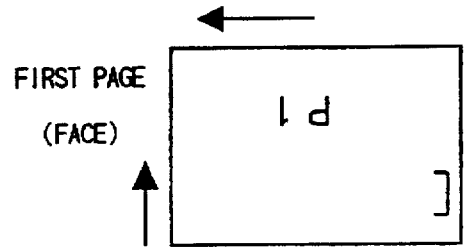
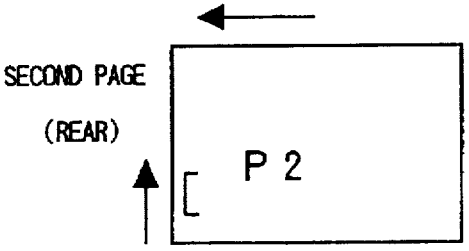

FIG. 12
(1) SHEET FOR JOB SEPARATION
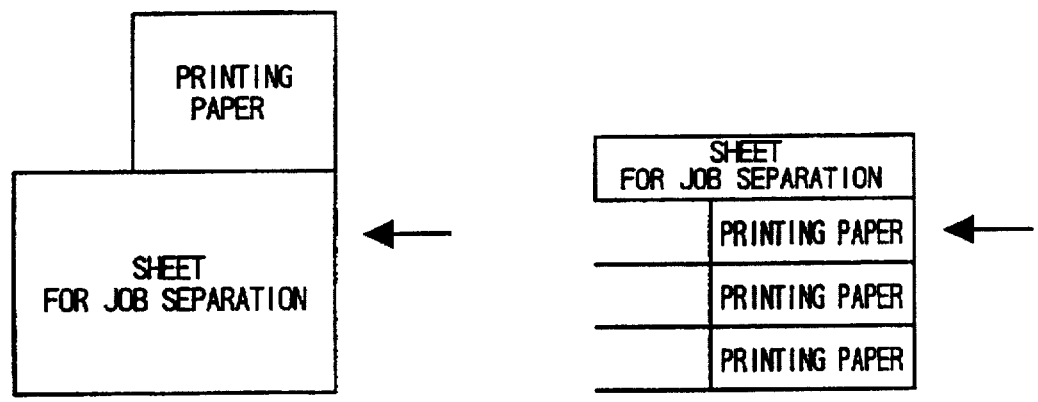
(2) OFFSET STACKING
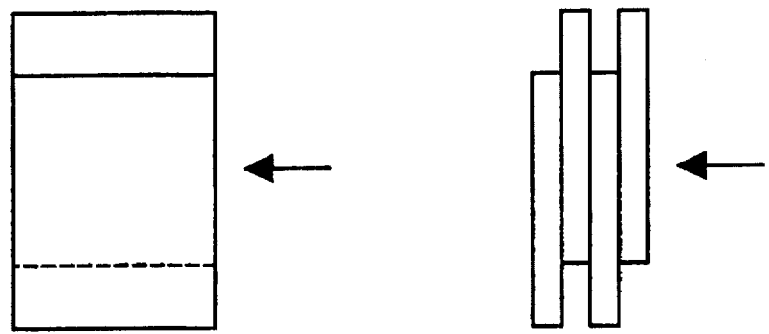

SIMPLEX/DUPLEX IMAGE FORMING APPARATUS WITH DOCUMENT MEMORY

FIELD OF THE INVENTION

The present invention relates to an image forming apparatus which discharges forms each with an image formed thereon according to an order of pages onto a tray.

BACKGROUND OF THE INVENTION

Methods of discharging a plurality sheets of forms each with an image or images formed thereon (printed paper) onto a tray according to an order of pages are divided to a method in which the forms are discharged in the regular order from the first page keeping a surface of each form with an image printed (called printed surface hereinafter) down (face-down system) and also a method in which the forms are discharged in the reverse order from the final pages keeping a surface of each form with the printed surface up (face-up system). By having printed forms discharged onto a tray according to an order of pages, the necessity for a user to rearrange printed forms according to the order of pages is eliminated, and especially in a case of the face-up system, the printed forms can be stapled as they are when discharged onto the tray.

Also there are several methods of forming images on duplex surfaces of each form. Namely in one method, after an image is formed on a top surface of a first sheet of printing paper, this printing paper is turned upside down and an image is formed on a rear surface of the printing paper, and subsequently each sheet of printing paper is processed in the same way. In another method, at first only odd number pages such as, for instance, a first page and a third page, are printed only on its top surface of each printing paper with the forms stacked on an intermediate tray (a duplex tray), and when printing on the final odd number page is complete, the forms stacked on the duplex tray are transferred (first-in-last-out) from the top one, namely the form printed last and then only a rear surface of each of even number pages are printed from the final even number. In the former method, the printing paper is turned upside down sheet by sheet, so that a time required for printing is long, and in the latter method the printing paper is not turned upside down sheet by sheet, which enables high speed printing.

For this type of image forming apparatus, there have been known, in addition to a copying machine, machines processing print data transmitted from a host system. However, print data is transmitted from a host system in the regular order of pages, in other words, in the order of the first page, the second page, and so on, and for this reason the face-down system as described above is employed, and practically the face-up system can not be employed. Of course the face-up system may be used, but printing paper is discharged onto a tray in the reverse order of pages, so that the forms can not be stapled as they are.

There is also a technological idea for controlling a page order with a printer driver in a host side so that the printer may simply print forms according to the page order specified by the host side. However, in most cases print data is generated in an application side according to a regular page order, and if the function described above is provided in a printer driver in the host side, a work load to the host system becomes very heavy, which is not advantageous when viewed from a viewpoint of performance in the entire system.

Although the above scheme is feasible in a system in which bit images are generated in the host side, in a printer running on a printer language, generally printing conditions for a preceding page (such as specification of a font, or specification of a page format) give influence to a subsequent page, and to overcome this problem control is required so that all pages are developed first in the host side and then printing conditions for a preceding page are carried over to a subsequent page, but this is technologically very difficult. Excluding a case where a printer manufacturer can provide a printer driver in such a case as Windows (trade name) or Macintosh (trade name), the technology described above can not be realized in a case such as DOS machines or the like where a printer manufacturer can not provide a printer driver.

SUMMARY OF THE INVENTION

It is an object of the present invention to provide an image forming apparatus which can control a page order of print data sent in the regular page order from the header page by each print job.

With the image forming apparatus according to the present invention, when images are printed on duplex surfaces of each form, the forms stacked on the duplex tray are transferred by first-in-last-out, and discharged with the face-up, so that the printed forms can be stapled.

With the image forming apparatus according to the present invention, when images are printed on duplex surfaces of each form, the forms stacked on the duplex tray are transferred by first-in-last-out, and discharged with the face-up, so that printing data transferred sequentially from the header page can rapidly be printed in the order of transferred pages for a printing job unit.

With the image forming apparatus according to the present invention, when images are printed on duplex surfaces of each form, the forms stacked on the duplex tray are transferred by first-in-last-out, and discharged with the face-down, so that printing data transferred sequentially from the header page can rapidly be printed in the order of transferred pages for a printing job unit.

With the image forming apparatus according to the present invention, when images are printed on duplex surfaces of each form, the forms stacked on the duplex tray are transferred by first-in-last-out, and discharged with the face-down, so that the printed forms can be stapled.

With the image forming apparatus according to the present invention, in a case where a number of sheets of form processed in one job exceeds an allowable number of sheets stacked for the duplex tray, a form for job separation is inserted in between the forms for each allowable number of sheets, so that a user can identify points when the job is stopped and when the job is restarted.

With the image forming apparatus according to the present invention, in a case where a number of sheets of form processed in one job exceeds an allowable number of sheets stacked for the duplex tray, forms for each allowable number of sheets are shifted to the paper discharge tray and discharged, so that a user can identify points when the job is stopped and when the job is restarted.

With the image forming apparatus according to the present invention, in a case where a number of sheets of form processed in one job exceeds an allowable number of sheets stacked for the duplex tray, the step of printing image data for odd number pages in the reverse order is divided into several substeps for each allowable number of sheets, so that an order of pages of printing data transferred sequentially from the header page can be controlled for a printing job unit.

With the image forming apparatus according to the present invention, image data is stored in the storage means with an intermediate page data format requiring a smaller quantity of data, so that the capacity of the storage means can be reduced.

With the image forming apparatus according to the present invention, image data is stored in the storage means with a page raster format, so that the image data can rapidly be printed.

With the image forming apparatus according to the present invention, image data is stored in a hard disk, so that costs of the storage means can be reduced.

With the image forming apparatus according to the present invention, when images are printed on duplex surfaces of each form and all the image data is only for odd number pages, the final page will be outputted as a blank page, so that duplex surfaces of each form can be printed without any inconvenience.

Other objects and features of this invention will become understood from the following description with reference to the accompanying drawings.

BRIEF DESCRIPTION OF THE DRAWINGS

FIG. 5 is an explanatory view showing various types of jobs;

FIG. 6 is an explanatory view showing a duplex printing mechanism of a printer;

FIG. 10 is an explanatory view showing a staple when data is printed in one surface of a form;

FIG. 11 is an explanatory view showing a stapling operation when image data is printed in duplex surfaces of a form; and FIG. 12 is an explanatory view showing a paper discharged state when a job is divided.

DESCRIPTION OF THE PREFERRED EMBODIMENT

Description is made hereinafter for an embodiment of the present invention with reference to the related drawings.

Figure 1:
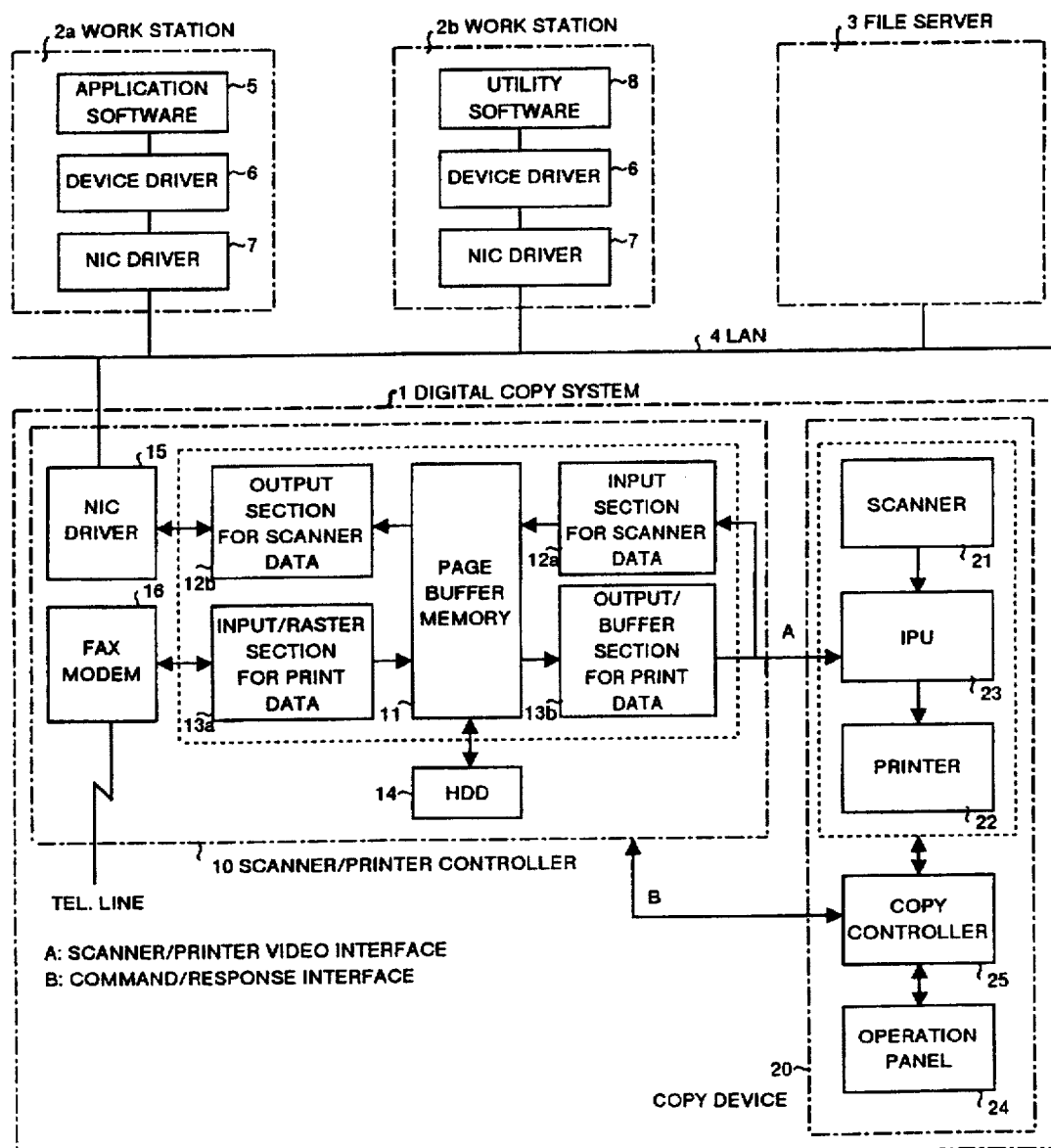
FIG. 1 is a block diagram showing general configuration of an image forming apparatus in an embodiment of the present invention.

A system shown in FIG. 1 comprises a digital copy system 1; a plurality of work stations (WS) 2a and 2b, and a file server 3 for a host; and a network OS required for a LAN system 4, and the figure shows a case where each user of the WSs 2a and 2b shares the digital copy system 1. There are various types of network operating system which, for instance, require a file server, or in which one unit of WS functions as both a server and a client, but in the present system, a given WS and the digital copy system 1 interactively communicate with each other through a physical LAN system and a certain network OS. The WS 2a comprises an application software 5, a device driver 6, and a network interface card (NIC) driver 7 for connecting to the LAN 4, while WS 2b comprises a utility software 8, a device driver 6 and an NIC driver 7.

The digital copy system 1 schematically comprises a scanner/printer controller (called just a controller hereinafter) 10 and a copy device 20. The copy device 20 is complete copying machine by itself, and comprises a scanner engine 21 having a auto-reverse document feeder 9 (ARDF), a printer engine 22 having a paper handling device such as a paper feeder tray, a duplex unit, and a paper discharge device for printing one surface of a sheet of printing paper and printing duplex surfaces thereof, and an image processing unit (IPU) for processing images for video data between the scanner 21 and the printer 22, and those scanner 21, printer 22 and IPU 23 constitute the copy engine.

The copy device 20 also comprises an operation panel section 24 having a display/touch panel for inputting/outputting data for copying operation, and a copy controller 25 for controlling copy engines 21 to 23 and an operation panel section 24. The operation panel section 24 comprises a display unit of a 400×640-dot LCD and a touch panel divided into 16×16 areas, and a user can set a copying function, a printing function, and a scanning function interactively by utilizing these display unit and touch panel, and also any status massage required by the scanner and printer can be displayed thereon.

The copy engines 21 to 23 provide controls for checking configuration of the copy engines 21 to 23, for instance, what types of optional device are attached thereto, checking states of component machines including the paper feeder tray, duplex unit, paper discharge unit, and ARDF, or for setting various types of paper paths (transfer paths for printed papers), and further for starting printing operation or scanning operation, checking a proceeding situation of copy process, and minutely checking an error state, if any error is generated.

The scanner/printer controller 10 and copy device 20 are connected to each other through a video interface A for inputting read image data by the scanner 21 and outputting image data to the printer 22, and also through a command/response interface B for instructing operations for the scanner 21 and printer 22, checking the state how the operations are performed, and communicating with the operation panel section 24.

The controller 10 comprises a page buffer memory 11, an input/buffer section 12a and an output section 12b each for scanner data, an input/raster section 13a and an output/buffer section 13b each for print data, and a hard disk drive (HDD) 14. The controller 10 is also connected to the LAN 4 through the NIC driver 15, and data stream from the printer 22, operation/edit commands for the scanner 21 and image data themselves are transferred through the LAN 4.

The controller is further connected to an external telephone line through a FAX (facsimile) modem 16, and received FAX data is recovered by the FAX modem 16 as image data. In this case, the image data is converted to resolution for the printer 22 as required, generated as print data in the page buffer memory 11, and the print data is printed out by the printer 22.

In a case of FAX transmission, a FAX message is sent when an instruction for FAX transmission and a telephone number for destination of the transmission are added to the print data during FAX transmission from the host. In this case, when a receiver in the receiver side can receive the same print data (not only a bit image, but also print data expressed by the printer language), the data stream is transferred thereto as it is through the modem 16. On the other hand, in a case of an ordinary FAX receiver, the print data is converted to FAX transmission images, and further subjected to necessary data compression, and transmitted through the modem 16.

The controller 10 also comprises an ordinary parallel serial interface, which is not shown herein, as an interface for connection to a printer, and a SCSI-2 interface as an interface for connection to a scanner, and for this reason, it can be used as a printer and a scanner connected in the ordinary 1 vs 1 connection. Detailed description for it is not made for the 1 vs 1 connection herein, but all input and output of data for a printer and a scanner are executed through a network.

Next, a description is made for input/output operations for the printer 22. At first, print data transferred from the host is suited to a printer language supported by the controller 10, and the printer languages include the Postscript and PCL or the like. There are various printers allowing use of a plurality of printer languages, and in that case any of the printer languages is selected according by a command, or set from the operation panel 24 before start of use, or is automatically determined by the controller 10 which is the most suited language, and the data is printed by transferring a data stream written in a particular printer language to a printer. In this case, the received printer data is converted to image data by page in the page buffer memory 11, and raster data for each is outputted to the printer 22 in the copy engine.

Next, a description is made for data input to the scanner 21, and the procedure and sequence for inputting data are as follows.

1) Conditions for scanning and a file ID (a temporary name) are set from the host or the operation panel 24.
2) A document to be read is set on a base for a document in the scanner 21.
3) Scanning a document is started by pressing down a copy start key.
4) Scanned data is directly subjected to an image compression by one page unit, and is stored in the page buffer memory 11.
5) The compressed data is accumulated by page unit in an inner HDD 14 which is a secondary memory or an external file server 3.
6) In a case where a page buffer memory 11 has a capacity enough for data for the next page to be stored therein, the scanning operation is continuously executed, and in a case where the capacity is not sufficient, scanning is halted until the data is transferred to the secondary memory.
7) In a case where a plurality of pages are to be scanned, a file name is automatically matched to each page number for filing.
8) The file stored in the secondary memories 14 and 3 is automatically deleted if the file is not read within a specified period of time specified from the outside.
9) If necessary, it is possible to visually check whether the read image data has correctly been read or not by actually printing the image. It is possible to check, for instance, whether the data is correctly read in the correct order or not, whether the data is read without any page being skipped or not, whether there is any skew in images or not, and whether contrast and image density of the data are appropriate or not. If the data has been inappropriately read out, the data is read out again.

The operation and processing described above are for writing data into the secondary memories 14 and 3, and the image data written in the secondary memory is naturally read out and used for some other purposes. Herein, writing operation and reading operation are executed independently, and a file is used as an interface. When data is written into the secondary memories 14 and 3, image data is subjected to image data compression for improvement of memory efficiency as well as for that of the data storage speed.

Even when data is transferred from the secondary memories 14 and 3 to the host system, image data may be compressed to reduce the quantity of required data, but in this case, an image data compression system for storing data in the secondary memories 14 and 3 is not always required to be the same as that for transferring the data to the host system, and they may be independent from each other. An advantageous compression system should be employed in each case, and selection of a suited compression system is one of the important functions of the scanner service software described later.

When all documents have been read out, a user removes the documents, returns with the documents from the installation site of the copy device 20 to the user's WS 2a or WS 2b, and then the copy device 20 may be used by some other users. Accordingly, it is not required that a scanner 21 is occupied until all operations and works of the scanner are complete in a case of a scanner based on the conventional technology.

Next, a description is made for a procedure for data output operations and the operational sequence.

1) A read-out image file is accessed from the WS 2b which is the host by using the utility software 8. In this step, all the image data can be uploaded as an image file as it is without any portion thereof being changed, but the data format should be suited for transfer format requested by the utility software 8 at least in the side of the machine (system 1). A software incorporated in the side of the machine 1 as described above is called a scanner service software hereinafter.

When an image file in the machine 1 is handled from the utility software 8, various types of operation can be executed. Herein, in a case where the utility software 8 has many functions operable from the utility software 8 and includes effective functions, it can be said that the software is high value-added scanner service (application) software. The most simple utility software 8 in a host system and the most simple scanner service software in the machine 1 are for transferring data from the machine 1 to the host systems 2a, 2b or others in a matched transfer format, and accordingly the utility software 8 and scanner service software work in an integrated state. These two types of software is called, when combined, scanner application software hereinafter.

2) There are two methods for transferring data in the machine 1 to the hosts 2a and 2b, and a first one is by using a copy function, and a second one is by using a move function. In the copy function, original image data is left in the machine 1, while an image file is transferred to the hosts 2a and 2b, an also the image file left in the machine 1 is automatically deleted unless it is again accessed within a prespecified period of time for a time out. In contrast, in the move function, after an image file is correctly transferred to the hosts 2a and 2b, the image file in the machine is immediately deleted.

In this case, in order to improve the operability thereof, it is desirable to provide functions for referring to a list of the read image files accumulated in the machine 1 by checking file names, deleting a specified image file, and setting a period of time of a time out for a specified file.

3) The image data transferred to the hosts 2a and 2b is incorporated in any of commercial application software which can handle images, thus the final object being achieved. Herein, scanner driver software is provided to a standard scanner unit, and the software is generally based on API (Application Program Interface) called TWAIN or ISIS, which is the substantial industry's standard.

For this reason, by using the interface suited to TWAIN or ISIS, any file can directly be uploaded from any of commercial scanner application software. Herein, a term of scanner utility software may be replaced to a term of driver software, or may include application software which handles image data independently, or may indicate the generic form including the software as described above.

Various functions can be incorporated in the scanner service software to achieve the final object for its use, and in this case, various operations are basically executed in the utility software of the hosts 2a and 2b, while specified operations or works are executed in the machine 1. For instance;

1) Conversion of resolution of an image

In a case of multivalued accumulated image data for an entire page, if the data is transferred as it is to the hosts 2a, 2b or others, the data volume is very large, and resolution of the display image may vary, so that by transferring the image data with resolution suited to that of a display unit in the hosts 2a, 2b or others, treatment to be executed in the hosts 2a, 2b or the others becomes simple, and also a time required for transfer can be shortened.

2) Conversion of a gradation degree of an image

In a case where the hosts 2a, 2b or others require a multivalued image and such operations as cutting or rotation are executed before the image is transferred, simple two-valued image data is adequate. This corresponds to prescan generally executed in ordinary scanner, and in this case a capacity of a work memory required in the hosts 2a, 2b or the others may be small, and a time required for transferring image data is short.

3) Rotation of an image

In a case where an orientation of an image read by the machine 1 is different from that of an image used in the hosts 2a, 2b or others, executing the specified rotation in the side of the machine 1 is convenient for the hosts 2a, 2b or others.

4) Cutting of a portion of an image

It is rare for the hosts 2a, 2b or others to use all the image data read by the machine 1 side, and if a required portion of the image can be cut off in the machine 1 side, transferred to the hosts 2a, 2b or others, and can be updated and accumulated as it is in the machine 1 side, it is very convenient.

The image forming apparatus according to the present invention can execute various types of image processing in addition to those described above. For instance, the image forming apparatus according to the present invention can select any of such operations as automatic skew conversion for an read image, automatic deletion of background noise, or character/feature conversion by an OCR according to the necessity and incorporate the function as a scanner service software.

To describe repeatedly, such functions as selection of data compression, formatting for transfer (to, for instance, the TIFF format), communication process (protocol) for transfer are indispensable as those of scanner service software when transferring a read-out original image or edited original image data to the host systems 2a, 2b or others.

Figure 2:
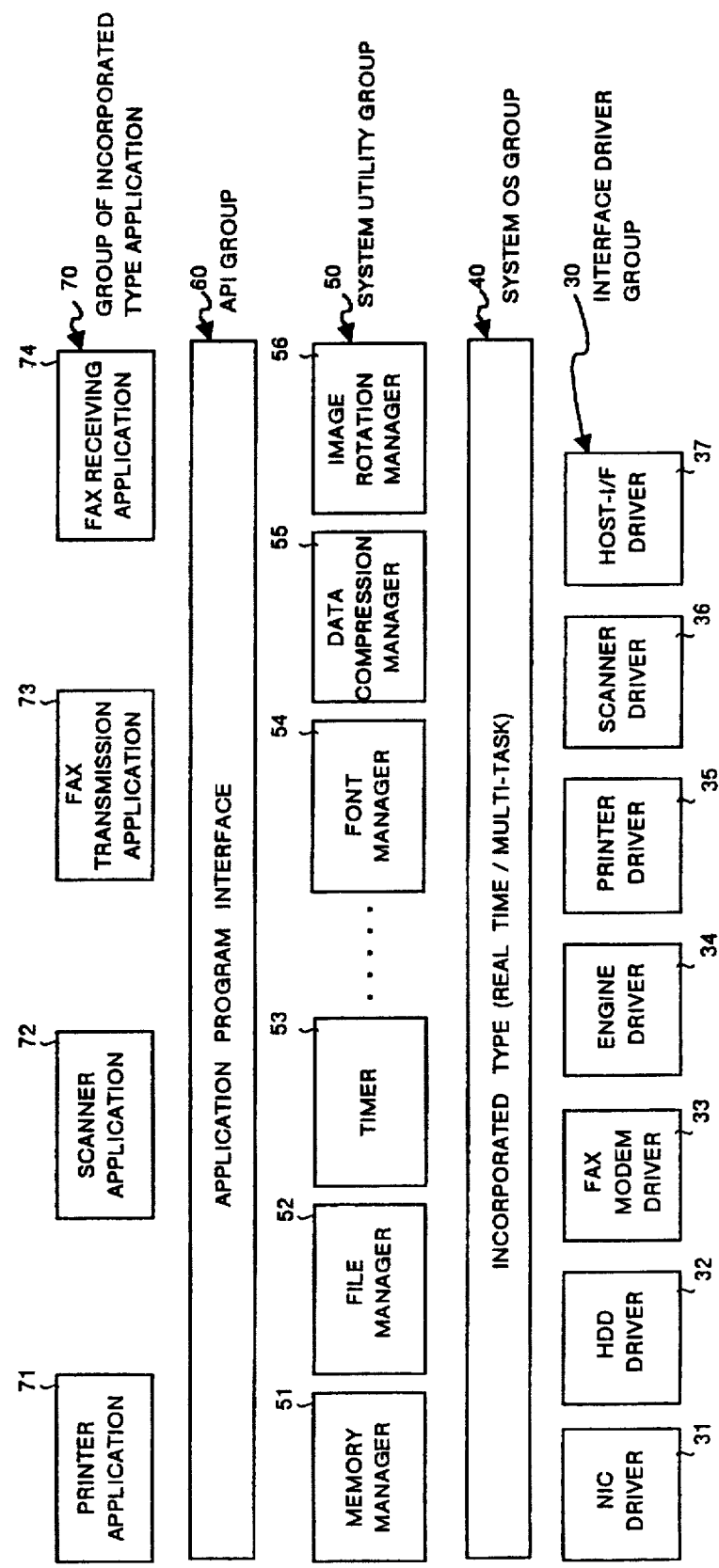
FIG. 2 is an explanatory view showing software configuration of a digital copying machine.

Next, a description is made for structure of the software with reference to FIG. 2. This structure comprises an interface driver group 30 which is the bottom layer for driving the hardware, a system OS group 40, a system utility group 50, an API group 60, and a group of incorporated type applications 70, which is the utmost top layer. The interface driver group 30, which is the bottom layer, has a NIC driver 31, an HDD driver 32, a FAX modem driver 33, an engine driver 34, a printer driver 35, a scanner driver 36, and a host I/F driver 37. These drivers 31 to 37 are controlled by the incorporated type real time/multi-task OS group 40, and schedule and execute a group of tasks irregularly generated.

The NIC driver 31, HDD driver 32, FAX modem driver 33 respectively control data exchange between the NIC driver 15, HDD driver 14, FAX modem 16 and each application 70, or utilities 50, while the host I/F driver 37 includes a parallel/serial interface for the printer 22 and an SCSI for the scanner 21 and controls data exchange between the machine 1 and the host 2a, 2b or the others. The engine driver 34 provides controls over status data exchange with copy engines 21 to 23, paper handling setting, start of printing or scanning, and communications with the operating panel 24. The printer driver 35 provides controls over output of printer vide data (setting for DMA or smoothing), and the scanner driver 36 provides controls over scanner video data (such as setting for DMA, data compression, or a scanner mode or the like).

The system utility software group 50 comprises a memory manager 51, a file manager 52, a timer 53, a font manager 54, a data compression manager 55, and an image rotation manager 56. The memory manager 51 manages a RAM 82 shown in FIG. 3, and enables efficient use of a limited memory capacity by dynamically allocating a memory space by way of physically allocating one memory according to a request from each task or application or releasing the memory. The file manager 52 is software which enables efficient use of the HDD 14, which is a secondary memory, and especially provides controls over file list management, registration or deletion of file names, lists and a real storage area.

The timer 53 can be shared by each task or each application, and delivers the right for use to a task or an application according to the necessity. The font manager 54 provides font data required by each printer language according to the necessity. The data compression manager 55 and image rotation manager 56 are software which can commonly be used for scanning, printing, and transmission/receiving from facsimile, and the system utility software group 50 has other software shared by related sections. An incorporated type of application groups 70 at the utmost top layer comprises a printer application 71, a scanner application 72, a FAX transmission application 73, ad FAX receiving application 74.

Figure 3:
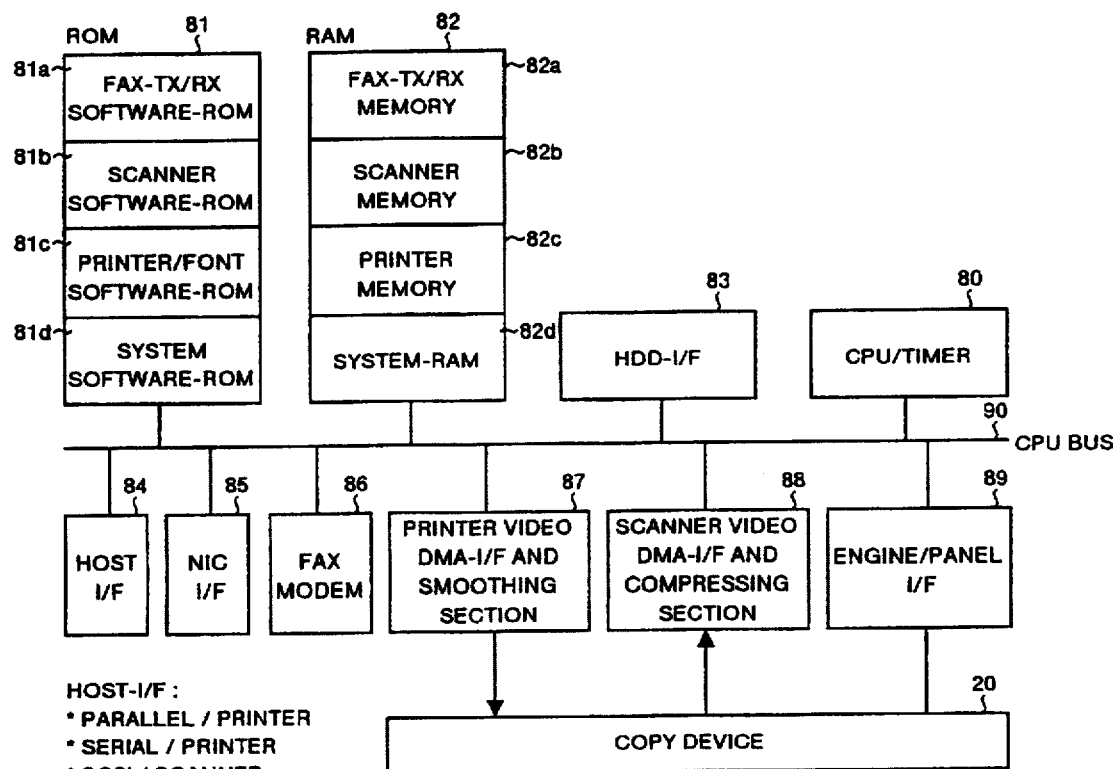
FIG. 3 is a block diagram showing hardware configuration of a digital copying machine.

Next description is made for general configuration of hardware in the scanner/printer controller 10 with reference to FIG. 3. The controller 10 comprises a CPU and a timer 80, a ROM 81, a RAM 82, an HDD-I/F 83, a host I/F 84, and NIC-I/F 85, a FAX modem 86, and also has a scanner 21 for a copy device 20, a printer video DMA-I/F and a smoothing section 87 which is a control section of video signals for the printer 22, a scanner video DMA-I/F and a compressing section 88, and an engine/panel I/F 89, and the above-described components are connected through a CPU bus 90 to each other. Herein input/output of video signals for the printer 22 are executed at a high speed, and such operations as direct input/output to a memory by DMA, a smoothing control for output from a printer, and data compression in input to the scanner 21 are executed by hardware including ASIC, LSI or the like.

The RAM 82 is built expandably, and it is one physically continuous memory, and is logically used for various purposes by the memory manager 51 shown in FIG. 2 (including the FAX transmission (TX)/receiving (RX) memory 82a, scanner memory 82b, printer memory 82c, and system memory 82d shown in the figure). In this case, each of the application software 71 to 74 or each of utility software 52 to 56 requests a necessary memory capacity to the memory manager 51 and acquires the memory capacity, and then starts execution of a work.

When the necessary memory capacity can not be acquired, the work can not be executed, so that the software stands by until the necessary memory capacity is acquired. For instance, in a case where a request for s scanner function is issued during execution of a printer function, if an adequate memory capacity is available, the two functions are concurrently executed, and in a case where the memory capacity is inadequate, the scanner function stands by until execution of the printer function is finished.

In the ROM 81, necessary programs (such as the FAXTX/RX software ROM 81a, scanner software ROM 81b, printer/font software ROM 81c, and system software ROM 81d shown in the figure) are stored. It should be noted that the programs may be stored in the HDD 14, and in this case only the program loading programs from the HDD 14 to the RAM 82 is stored in the ROM 81. The programs loaded in this step are run on the RAM 82.

The programs 81a to 81d supplied to the ROM 81 or HDD 14 are modularized for each of the application software 71 to 74. For this reason, for instance, by making the scanner service software (scanner application software 72) described above independent for each unit for loading to the ROM module or the HDD 14 for optionalizing scanner function and supplying the software only to users requiring it, it is possible to reduce a cost burden to users not requiring it.

Figure 4:
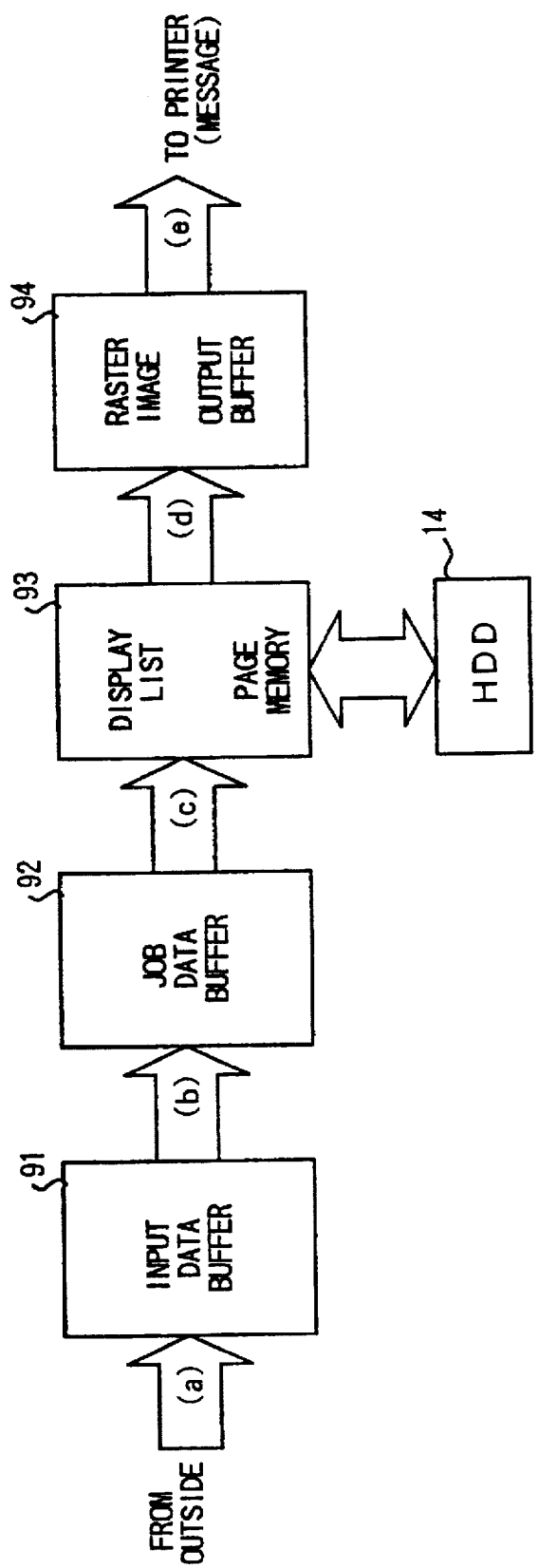
FIG. 4 is an explanatory view showing a data processing of a printer controller.

Next, a description is made for data processing by the printer controller 10 with reference to FIG. 4. Generally print data changes its status in the controller 10 and is finally printed as raster data on printing paper. The data status is, as shown in FIG. 4, changed in the form of memory to memory, and for this reason memory-to-memory operations a to e for changing the data status are executed.

Contents of the operations a to e a) Synchronization of data streams synchronously transmitted from the outside is executed using an input data buffer 91.

b) A data stream synchronized by the input data buffer 91 is divided by a job data buffer 92 into several job units and stored in the divided form. The job units as used herein means each printer language (such as PCL5/PS2) or each user.

c) Each job is converted to intermediate data for each page (display list 93). This is two-dimensionally arranged data including actual page layout data, font data, and paper size data.

d) Intermediate data is fixed by page, and is mechanically converted to a raster image (raster image output buffer 94)

e) Flame-synchronism with the printer engine 22 is realized and the data is outputted as video data.

In this case, controls for stacking printing paper in the face-up state according to the reverse page order as well as for skipping page for printing on duplex surfaces of each sheet of printing paper are executed by storing image data as intermediate data in the HDD 14 and searching the data. Herein a capacity of the HDD 14 is not indefinite, and there is a limit in the capacity, so that, in a case where a size of one job exceeds an allowable capacity of the HDD 14, execution of the job is impossible. For reverse page order control and page skipping control, page data is saved in the HDD 14 in any of the following three ways.

1) Storage as a job data file

In many cases one job comprises a plurality of pages, and generally conditions specified in a preceding page (such as selection of a font, or specification of a page format) are succeeded by and affects a subsequent page. In this case, page order can not be controlled for each job, and this method can not be employed.

2) Storage as an intermediate page data (display list 93) file

In this method, image data can be stored by page, and also the page order can be controlled.

Merits

Generally a quantity of required data is small.

The quantity of data does not depend on the resolution.

Demerits

A period of time required for converting to a final raster is long.

Such parameters as downloaded font may be deleted during execution of a job.

3) Storage as a raster data file

Data can be stored by page, and also the page order can be controlled.

Merits

The data has been changed to a raster, so that a time for post processing is not necessary.

The data is in the final data state, so that no mistake in data processing occurs.

Demerits

The quantity of data is generally large.

The quantity of data depends on the resolution.

In a case where it is determined whether data is stored into HDD 14 as intermediate data or raster data, when taking into account a transfer rate for inputting data into or outputting data from the HDD 14, storing data as intermediate data is preferable because a required quantity of data is smaller. In this case, a time required for inputting data into or outputting data from the HDD 14 is a bottle neck, which largely affects performance in printing.

Assuming that 40 bytes are added for one character in a case of a standard text (on average 5K bytes/page) for performance definition, in a case of intermediate data, the average data rate is 200K bytes/page. Also assuming that 100 pages are to be prepared as surplus for reverse page order control or page skipping control, a memory capacity of 20M bytes is required to the HDD 14. In a case where a multi-functional machine is built in the digital copying machine 1, a large memory capacity is required, and for this reason it is desirable to previously estimate how large memory capacity (HDD 14) is required for the HDD 14, and in general applications the memory allocation as shown in FIG. 5 is reasonable.

Then description is made for a paper path in the printer engine 23 with reference to FIG. 6. Generally the two types of configuration as shown in FIG. 6 are conceivable. The first type of configuration is a case where, as shown in (1) of FIG. 6, it is built with a discharged paper tray 105 for face-up stacking using the reversing section 103 and the duplex reverted stacking tray 104, and the second type of configuration is a case where it is built with the discharged paper tray 105 for face-down stacking using the reversing sections 103, 106 and the duplex reverted stacking tray 104 as shown in (2) of FIG. 6.

(1) A case where a face-up stacking output tray is used (1)-1: When an image is formed on one surface of printing paper At first, in (1) of FIG. 6, if an image is formed on each sheet of printing paper fed from a paper feed tray 101 by a drum 102 and the printing paper is discharged in the face-up state onto the discharged paper tray 105, forms are stacked on the discharged paper tray according to the reverse page order, which is inconvenient. So by generating print data (a job consisting of a plurality of page) for all pages as intermediate data requiring a small quantity of data and storing it in the RAM 82 or HDD 14 (called simply as memory hereinafter) and then reading and converting the page data to actual image according to the reverse page order, printed paper is stacked on the discharged paper tray 105 according to the regular page order. In this case, the sheets of printed paper are stacked in the face-up state according to the regular page order, so that the stapling function can be used without rearranging an order of the sheets.

(1)-2: When images are to be formed on duplex surfaces of each sheet of printing paper Also in FIG. 6A, if a first page of a first sheet of printing paper fed from the paper feed tray 101 is printed by the drum 102, then the front edge and rear edge are switched back by the reverting section 103, the sheet is sent to the duplex reverted stacking tray (simply called a "duplex tray" hereinafter) 104 and then a second page of the first sheet is printed by the drum 102 with the printed paper discharged in the face-down state onto the discharged paper tray 105. The printed paper is stacked on the discharged paper tray 105 according to the regular page order, but the printing speed is very slow.

Figure 7:
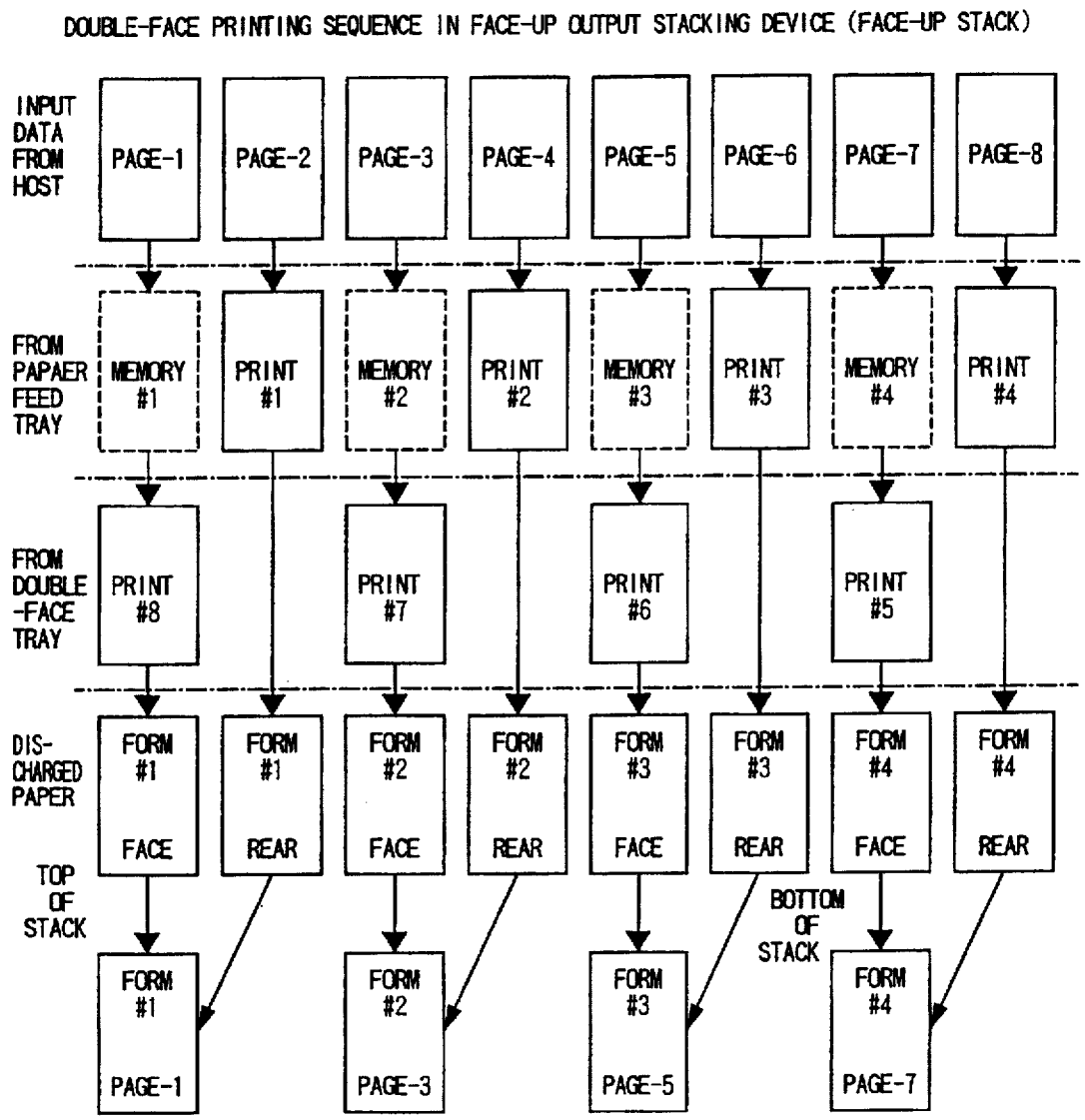
FIG. 7 is an explanatory view showing a duplex printing sequence in a face-up outputting device.

There are two way of printing duplex surfaces of each sheet of printing paper without making the printing speed slower. At first, as shown in FIG. 7, image data for odd number pages is generated as intermediate data and stored in a memory, then printing paper is fed sheet by sheet from the paper feed tray 101, only even number pages are printed according to the regular page order, and printed paper is stacked on the duplex tray 104 successively. In this case, sheets of even number pages are stacked on the tray 104 in the face-up state and also according to the regular page order. Then, when printing of all even number pages is complete, printed sheets on the double tray 104 are fed from the top one to convert image data for odd number pages stored in the memory to actual images according to the reverse page order with the sheets discharged onto the discharged paper tray 105.

To simply show an order of printing 8 pages (#1 to #8) (4 sheets of printing paper), the order is as follows:

2→#4→#6→#8→Duplex tray 104→#7→#5→#3→#1→Discharged paper tray 105

In this case, the printed paper is stacked in the face-up state and according to the regular page order, so that the stapling function can be used.

Another method is not shown in the figure, but in this method, image data for all pages is generated as intermediate data and stored in a memory, and at first only odd number pages are printed according to the reverse page order, and the printed paper is stacked on the duplex tray 104. When printing of all odd number pages is complete, printed sheets on the duplex tray 104 are fed from the top one, and even number pages are printed according to the regular page order. The sequence is as follows.

7→#5→#3→#1—Duplex tray 104→#2→#4→#6→#8→Discharged paper tray 105

In this method, printed paper is discharged in the face-down state, but according to the regular page order, there are a plurality of print jobs to be executed at a different timing respectively, and a job to be executed earlier is executed before a job to be executed later, which is convenient for users.

In the two method described above, it is not necessary to accumulate image data for all pages in a memory in the former method, so that a time required for first printing is short. In the latter method, image data for all pages is accumulated in a memory, so that the time required for first printing becomes longer, but the method is convenient for users who are accustomed to face-down printing. Also in a case where a page is large in quantity, the efficiency in continuous printing is higher in the latter method. Furthermore in the latter method, even in a case where a number of pages exceeds an allowable number of pages for the duplex tray 104, the printing job is internally divided to a plurality of jobs and printing is executed with a number of pages within the allowable number of pages for the duplex tray 104, so that a large printing job can be executed according to the regular page order.

It should be noted that, when images are to the formed on duplex surface of each sheet of printing paper, if the printing job extends over an odd number of pages, the final page is automatically outputted as a blank page. Also in a case of printing job which is executing at different timing, it is needless to say that the job is divided by using the function of Doggy_tail_job_separation (off_set_stacker) in the toggling state, or when forms having the same size but different orientations exist in the printer 22, by inserting the forms between jobs.

(2) In case of a face-down stack output tray (2)-1: When an image is formed on one surface of each sheet of printing paper Generally print data is transferred from the host machines 2a, 2b according to the regular page order, so that the pages are prepared and printed out according to the sequence as it is. In this case as shown in FIG. 6B, at first an image is formed by the drum 102 on each sheet of forms fed from the paper feed tray 101, each sheet of the forms is reverted by the reverting section 106, discharged onto the discharged paper tray 105 in the face-down state, and stacked on the discharged paper tray 105, and the forms are stacked according to the regular page order. In this case, the forms are stacked in the face-down state, so that the stapling function can not be used.

(2)-2: When images are formed on duplex surfaces

Figure 8:
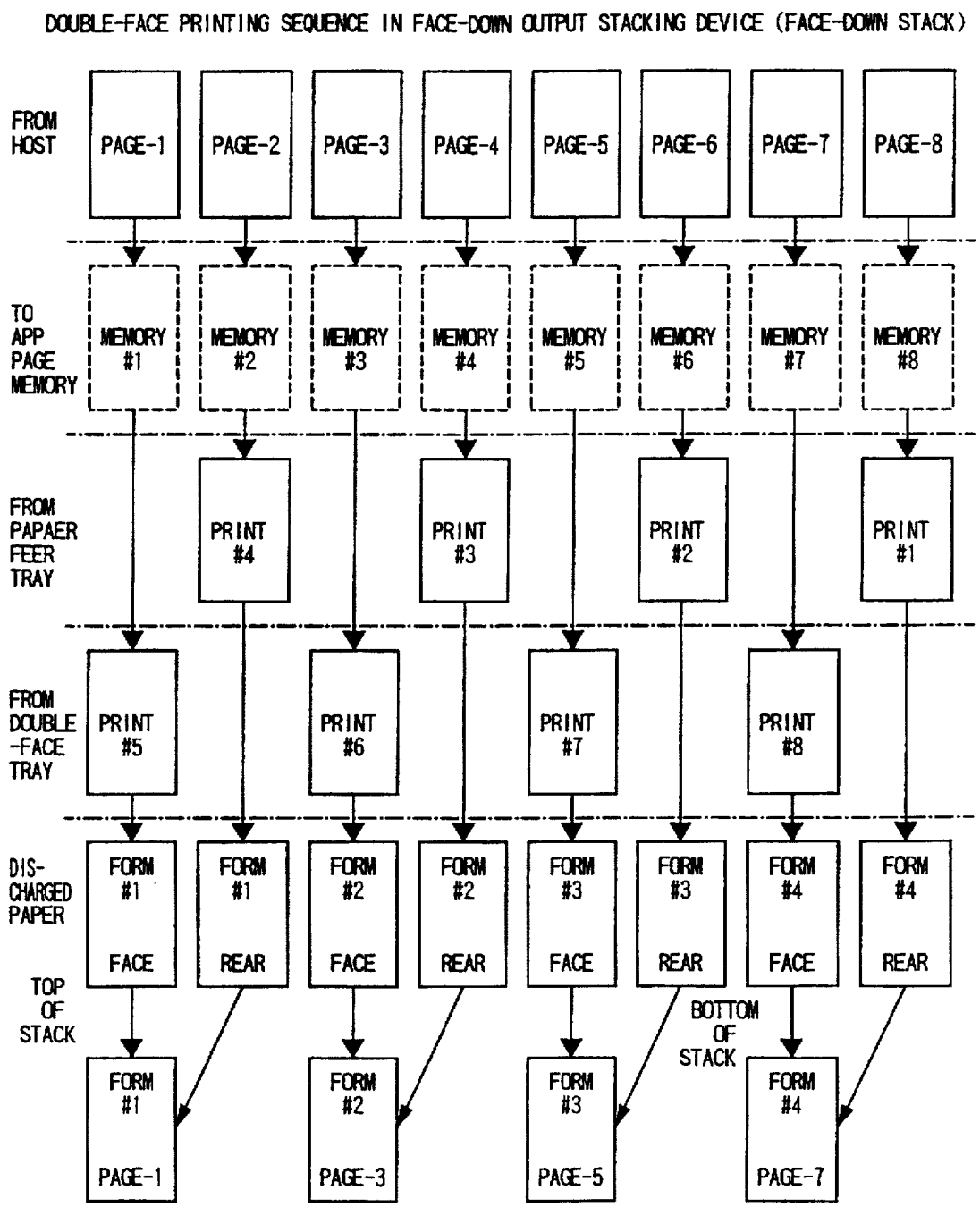
FIG. 8 is an explanatory view showing a duplex printing sequence in a face-down outputting device.
Figure 9:
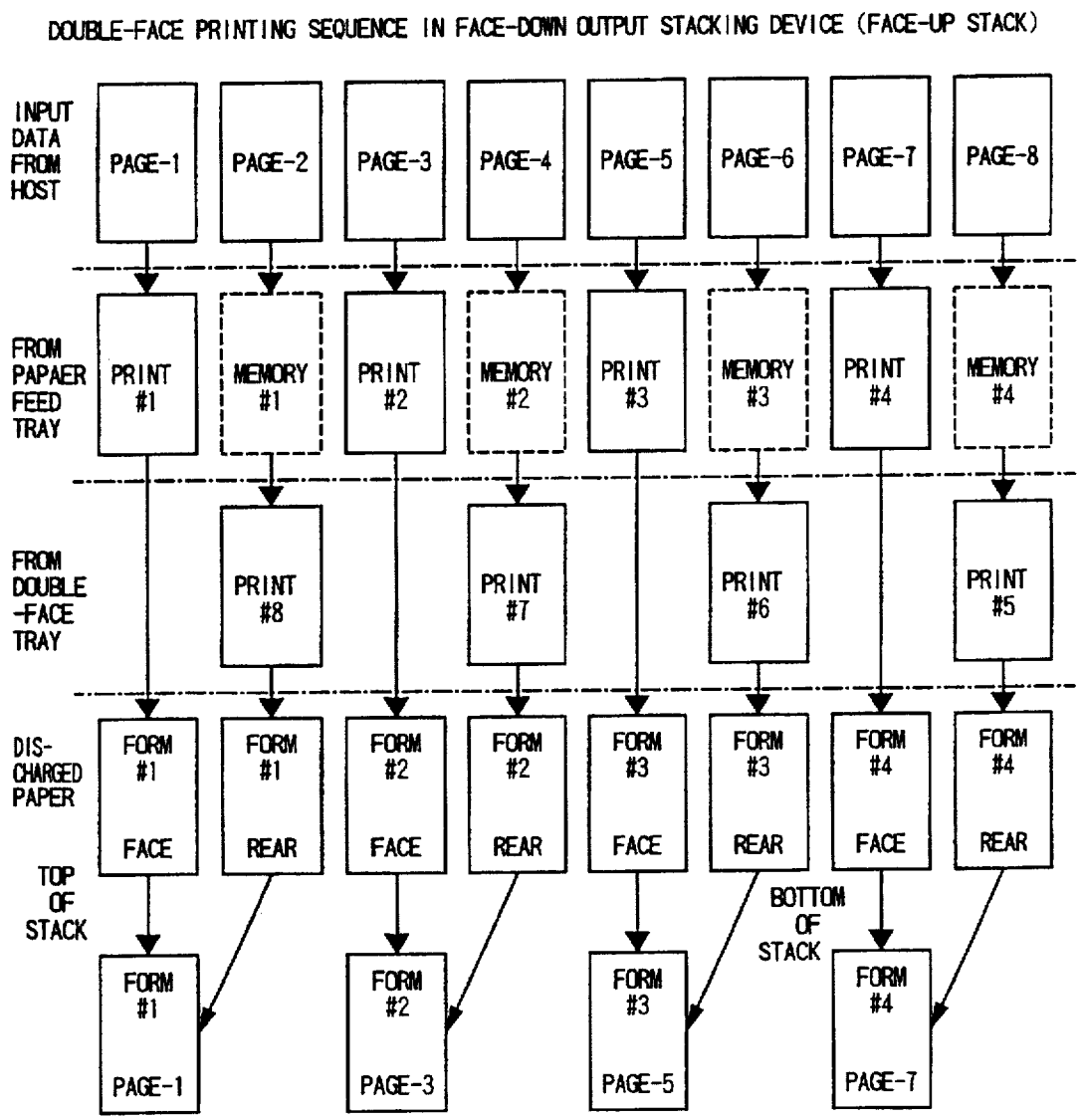
FIG. 9 is an explanatory view showing another duplex printing sequence in a face-down outputting device.

There are also two methods of stacking forms according to the regular page order without making the printing speed slower. In the first method, as shown in FIG. 8, image data for all pages in the printing job are stored as intermediate data in a memory, and at first image data for even number pages is converted to actual images according to the reverse page order with the pages stacked on the duplex tray 104 according to the sequence as shown below.

8→#6→#4→#2→Duplex tray 104→#1→#3→#5→#7→Discharged paper tray 105

Then when printing of all even number pages is complete, the printed sheets stacked on the duplex 104 are fed from the top one, image data for odd number pages stored in the memory is converted to actual images according to the regular page order with the sheets reverted by the reverting section 106 and discharged onto the discharged paper tray 105.

When images are to be formed on duplex surfaces of each sheet of printing paper, according to the sequence as shown below:

1→#3→#5→#7→Duplex tray 104→#8→#6→#4→#2→Discharged paper tray 105 odd number pages are printed according to the regular page order with the printed sheets stacked on the duplex tray 104, and image data for even number pages is stored as intermediate data in a memory. When printing of all the odd number pages is complete, printed sheets stacked on the duplex tray 104 are fed from the top one with the image data for even number pages converted to actual images according to the reverse page order, and the printed sheets are reverted by the reverting section 106 and discharged onto the discharged paper tray 105. In this case, the printed sheets are stacked in the face-up state and also according to the regular page order, so that the stapling function can be used.

Of the two methods described above, in the latter one it is not necessary to accumulate image data for all pages in a memory, so that a period of time required for first print is short. In the former method, image data for all pages is accumulated in a memory, so that a period of time for first print becomes longer, but the method is convenient for users who are accustomed to stacking in the face-down state. Also when a complicated image is to be printed on a page, efficiency in continuous printing in the latter method is higher as compared to that in the former method. Furthermore in the latter method, even in a case where a number of pages to be printed exceeds an allowable number of pages for the duplex tray 104, a large job can be processed according to the regular page order by internally dividing the job into a plurality of jobs and printing by a unit number of pages within the allowable number of pages for the duplex tray 104.

Next, a description is made for a position or positions for stapling when an image is formed on one surface of each sheet of printing paper with reference to FIG. 10. FIG. 10 (1) shows positions where stapling can be executed, and FIG. 10 (2) and (3) show positions for stapling and a position of an image corresponding to a page size and the printing direction. It should be noted that this stapling device is based on a 1-bin finisher system based on the face-up stack output tray system or the offset stack system (job separation shown in FIG. 12). In FIG. 10 (1), a front side of the printer 22 and a direction in which paper is discharged are as indicated by the arrow marks, stapling is executed in the following three ways: at one position in the right bottom section as shown in FIG. 10 (1) (a), at two positions in the right central section as shown in FIG. 10 (1) (b), or at one position in the right top section as shown in FIG. 10 (1) (c).

Under the conditions as described above, the relation between a position of an image and positions for stapling in a case of printing paper having an A4 or letter size is as shown in FIG. 10 (2). In a case of portrait printing, it is necessary to output an image so that an upper section of the printing paper corresponds to a lower section of the real image, and in this case stapling is executed at one position in the right bottom section as shown in FIG. 10 (2) (a). In a case of landscape printing, it is necessary to output an image so that a left section of the printing paper corresponds to a lower section of the real image, and in this case stapling is executed at one position in the right top section as shown in FIG. 10 (2) (b).

Under the same conditions, the relation between a position of an image and positions for stapling in a case of printing paper having an A3 or double-letter size is as shown in FIG. 10 (2). Namely, in a case of portrait printing, it is necessary to output an image so that a left section of the printing paper corresponds to a lower section of the real image, and in this case stapling is executed at one position in the right top section as shown in FIG. 10 (3). In a case of landscape printing, it is necessary to output an image so that an upper section of the printing paper corresponds to a lower section of the real image, and in this case stapling is executed at one position in the right bottom section as shown in FIG. 10 (3) (b). Next, a description is made for stapling position when images are formed on duplex surfaces of each sheet of printing paper with reference to FIG. 11. FIG. 11 (1) shows positions for stapling, a direction in which printing paper is discharged, and a raster scanning direction in a case of portrait printing as well as in landscape printing in a case where printing paper is fed in the longitudinal direction, while FIG. 11 (2) shows those in a case where printing paper is fed in the lateral direction.

In a case of portrait printing where printing paper is fed in the longitudinal direction, as shown in FIG. 11 (1) (a), a front and erect image is outputted in both the top and rear surfaces so that an upper section of the printing paper corresponds to a lower section of the real image, and stapling is executed in the left top section of the image (at one position in the right bottom section of the printing paper), and the raster scanning direction for the image is common to both the top and rear surfaces. Also in a case of landscape printing in which printing paper is fed in the longitudinal direction, as shown in FIG. 11 (1) (b), a front and erect image is outputted in both the top and rear surfaces so that a left section of the printing paper corresponds to a lower section of the image, and stapling is executed in the left top section (at one position in the right top section of the printing paper), and the raster scanning direction is common to both the top and rear surfaces.

In a case of portrait printing where printing paper is fed in the lateral direction, as shown in FIG. 11 (2) (a), a front and erect image is outputted on the top surface so that a left section of the printing paper corresponds to a lower section of the image, and a front and erect image is outputted on the rear surface so that a right section of the printing paper corresponds to a lower section of the image, and stapling is executed in the left top section of the image (at one position in the right top section of the printing sheet). The raster scanning direction on the top surface is displaced by 180 degrees from that on the rear surface. In a case of landscape printing where printing paper is fed in the lateral direction, as shown in FIG. 11 (2) (b), a front and erect image is outputted on the top surface so that an upper section of the printing paper corresponds to a lower section of the image, and a front and erect image is outputted on the rear surface so that a lower section of the printing paper corresponds to a lower section of the image. Stapling is executed in the left top section of the image (at one position in the right lower section of the printing sheet), and the raster scanning direction on the top surface is displaced by 180 degrees from that on the rear surface.

FIG. 12 shows two types of job separation. FIG. 12 (1) shows a method of inserting a separation sheet between jobs, and this method can be employed only in a case where a plurality of sheets of printing paper having the same size but a different orientation are prepared in the printer 22. FIG. 12 (2) shows a method based on the offset stacking (doggy tail) technique in which sheets of printing paper are stacked by shifting a position in a direction vertical to a direction in which printing paper is physically carried.

Finally description is made for a case where a allowable number of sheets stacked on the tray 104 shown in FIG. 6 is 50 sheets. In this case, a job exceeding 100 pages must be divided to a plurality of jobs by a unit of 50 sheets (100 pages) in the controller 10. However, when a job exceeds an allowable number of sheets to be stacked on the discharged paper tray 105, execution of the job is interrupted at a point of time, an alert is given to the host side, and the printed sheets of printing paper are discharged onto a pool tray or other empty tray. A way of dividing a job varies according to a paper discharging unit, but generally the job separation as shown in FIG. 12 (1) or FIG. 12 (2) is executed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus comprising:

an image forming unit for receiving image data for a first plurality of pages in a regular order and forming an image on a surface of a form from image data for a page;

a duplex tray for holding a stack of forms each with a first image formed on a first surface thereof by said image forming unit so that a second image is formed on a second surface of each form by feeding said forms sheet by sheet from the top of the stack to said image forming unit;

a paper discharge tray;

a memory for storing therein the image data; and a controller for providing controls, when forming an image on a simplex surface of each form, to perform the steps of:

forming images on first surfaces of the first plurality of forms from said image data in the regular order, and discharging the first plurality of forms onto said paper discharge tray;

wherein said controller, when images are formed on duplex surfaces of each form, further provides controls to perform the steps of:

(a) storing the image data for all pages in said memory, (b) forming first images on first surfaces of a second plurality of forms from the image data for even pages stored in said memory in the regular order, (c) stacking the second plurality of the forms on said duplex tray, (d) feeding the second plurality of forms on said duplex tray to said image forming unit from the top of the stack sheet by sheet, (e) forming second images on second surfaces of the second plurality of forms from the image data for odd pages stored in said memory in the reverse order, and (f) discharging the second plurality of forms onto said paper discharge tray.

2. An image forming apparatus according to claim 1, wherein said controller, when images are formed on duplex surfaces of each form, further provides signals for performing the steps of:

determining whether a number of forms to be processed in one job exceeds an allowable number of sheets for said duplex tray; and performing steps (b)–(f) in several substeps for each allowable number of forms, when it is determined that the number of forms to be processed in one job exceeds the allowable number of forms for said duplex tray.

3. An image forming apparatus according to claim 1, wherein said controller further provides controls to perform the steps of:

determining whether a number of forms processed in one job exceeds an allowable number of forms stacked on said duplex tray;

feeding all of the allowable number of forms stacked on the duplex tray to said image forming unit;

forming the second images on the allowable number of forms from the image data;

discharging the forms onto said paper discharge tray; and inserting a form for job separation when a remaining job is restarted.

4. An image forming apparatus according to claim 1, wherein said controller further provides controls to perform the steps of:

determining whether a number of forms processed in one job exceeds an allowable number of forms stacked in said duplex tray;

feeding all the forms stacked on said duplex tray within the allowable number of sheets to said image forming unit;

forming the second images on all the forms from the image data;

discharging the forms with the images formed thereon onto said paper discharge tray; and when a remaining job is restarted, shifting the forms discharged onto said paper discharge tray by the allowable number of sheets.

5. An image forming apparatus according to claim 1, wherein the step of storing said image data for all pages in said memory includes the step of storing the image data for all pages in said memory with an intermediate page data format requiring a smaller quantity of data.

6. An image forming apparatus according to claim 1, wherein the step of storing the image data for all pages in said memory includes the step of storing the image data for all pages in said memory with a page raster format.

7. An image forming apparatus according to claim 1, wherein the step of storing the image data for all pages in said memory includes the step storing the image data for all pages in a hard disk.

8. An image forming apparatus according to claim 1, wherein said controller further provides controls, when images are formed on duplex surfaces of each form, to perform the step of outputting the final page as a blank page when the first plurality is odd.

9. An image forming apparatus comprising:

an image forming unit for receiving image data for a first plurality of pages in a regular order and forming an image on a surface of a form from image data for a page;

a duplex tray for holding a stack of forms each with a first image formed on one surface thereof by said image forming unit so that a second image is formed on a second surface of each form by feeding the forms sheet by sheet from the top of the stack to said image forming unit;

a paper discharge tray;

a memory for storing therein the image data; and a controller for providing controls, when an image is formed on a simplex surface of each form, to perform the steps of:

storing the image data for all pages in said memory, forming images on first surfaces of the first plurality of forms from the image data stored in said memory in the reverse order, and discharging the first plurality of forms onto said paper discharge tray;

wherein said controller, when images are formed on duplex surfaces of each form, further provides controls to perform the steps of:

(a) storing image data only for odd pages in said memory, (b) concurrently with step (a), forming first images on first surfaces of a second plurality of forms from the image data for even forms in the regular order, (c) stacking the second plurality of forms on said duplex tray, (d) feeding the forms from the top of said stack on said duplex tray to said image forming unit, (e) forming second images on second surfaces of said second plurality of forms from the image data for said odd pages stored in said memory in the reverse order, and (f) discharging the forms onto said paper discharge tray.

10. An image forming apparatus according to claim 9, wherein said controller further provides controls to perform the steps of:

determining whether a number of forms processed in one job exceeds an allowable number of forms stacked on said duplex tray;

feeding all of the allowable number of forms stacked on the duplex tray to said image forming unit;

forming the second images on the allowable number of forms from the image data;

discharging the forms onto said paper discharge tray; and inserting a form for job separation when a remaining job is restarted.

11. An image forming apparatus according to claim 9, wherein said controller further provides controls to perform the steps of:

determining whether a number of forms processed in one job exceeds an allowable number of forms stacked in said duplex tray;

feeding all the forms stacked on said duplex tray within the allowable number of sheets to said image forming unit;

forming the second images on all the forms from the image data;

discharging the forms with the images formed thereon onto said paper discharge tray; and when a remaining job is restarted, shifting the forms discharged onto said paper discharge tray by the allowable number of sheets.

12. An image forming apparatus according to claim 9, wherein the step of storing said image data for odd pages in said memory includes the step of storing the image data for the odd pages in said memory with an intermediate page data format requiring a smaller quantity of data.

13. An image forming apparatus according to claim 9, wherein the step of storing the image data for odd pages in said memory includes the step of storing the image data for the odd pages in said memory with a page raster format.

14. An image forming apparatus according to claim 9, wherein the step of storing the image data for odd pages in said memory includes the step storing the image data for the odd pages in a hard disk.

15. An image forming apparatus according to claim 9, wherein said controller further provides controls, when images are formed on duplex surfaces of each form, to perform the step of outputting the final page as a blank page when the first plurality is odd.

16. An image forming apparatus comprising:

an image forming unit for receiving image data for a first plurality of pages in a regular order and forming an image on a surface of a form from image data for a page;

a duplex tray for holding a stack of forms each with a first image formed on a first surface thereof by said image forming unit so that a second image is formed on a second surface of each form by feeding said forms sheet by sheet from the top of said stack to said image forming unit;

a paper discharge tray;

a memory for storing therein the image data; and a controller for providing controls, when an image is formed on a simplex surface of each form, to perform the steps of:

storing the image data for all pages in said memory, forming images on first surfaces of said first plurality of forms from the image data stored in said memory in reverse order, and discharging the first plurality of the forms onto said paper discharge tray;

wherein said controller provides controls, when images are formed on duplex surfaces of each form, to perform the steps of:

(a) storing the image data for all pages in said memory, (b) forming first images on first surfaces of a second plurality of forms from the image data for odd number pages stored in said memory in the reverse order, (c) stacking the forms on said duplex tray, (d) feeding the forms stacked on said duplex tray from the top of the stack to said image forming unit and (e) forming second images on second surfaces of the second plurality of forms from the image data for even pages stored in said memory in the regular order, (f) discharging the forms onto said paper discharged tray.

17. An image forming apparatus according to claim 16, wherein said controller, when images are formed on duplex surfaces of each form, further provides signals for performing the steps of:

determining whether a number of forms to be processed in one job exceeds an allowable number of sheets for said duplex tray; and performing steps (b)–(f) in several substeps for each allowable number of forms, when it is determined that the number of forms to be processed in one job exceeds the allowable number of forms for said duplex tray.

18. An image forming apparatus according to claim 16, wherein said controller further provides controls to perform the steps of:

determining whether a number of forms processed in one job exceeds an allowable number of forms stacked on said duplex tray;

feeding all of the allowable number of forms stacked on the duplex tray to said image forming unit;

forming the second images on the allowable number of forms from the image data;

discharging the forms onto said paper discharge tray; and inserting a form for job separation when a remaining job is restarted.

19. An image forming apparatus according to claim 16, wherein said controller further provides controls perform the steps of:

determining whether a number of forms processed in one job exceeds an allowable number of forms stacked in said duplex tray;

feeding all the forms stacked on said duplex tray within the allowable number of sheets to said image forming unit;

forming the second images on all the forms from the image data;

discharging the forms with the images formed thereon onto said paper discharge tray; and when a remaining job is restarted, shifting the forms discharged onto said paper discharge tray by the allowable number of sheets.

20. An image forming apparatus according to claim 16, wherein the step of storing said image data for all pages in said memory includes the step of storing the image data for all pages in said memory with an intermediate page data format requiring a smaller quantity of data.

21. An image forming apparatus according to claim 16, wherein the step of storing the image data for all pages in said memory includes the step of storing the image data for all pages in said memory with a page raster format.

22. An image forming apparatus according to claim 16, wherein the step of storing the image data for all pages in said memory includes the step storing the image data for all pages in a hard disk.

23. An image forming apparatus according to claim 16, wherein said controller further provides controls, when images are formed on duplex surfaces of each form, to perform the step of outputting the final page as a blank page when the first plurality is odd.

24. An image forming apparatus comprising:

an image forming unit for receiving image data for a first plurality of pages in a regular order and forming an image on a surface of a form from images data for a page;

a duplex tray for holding a stack of forms each with a first image formed on one surface thereof by said image forming unit so that a second image is formed on a second surface of each form by feeding the forms sheet by sheet from the top of the stack to said image forming unit;

a paper discharge tray;

a memory for storing therein the image data; and a controller for providing controls, when an image is formed in a simplex surface of each form, to perform the steps of:

forming images on first surfaces of the first plurality of forms from the image data in the regular order, discharging the forms onto said paper discharged tray;

wherein said controller, when images are formed on duplex surfaces of each form, further provides controls to perform the steps of:

(a) storing the image data for even number pages in said memory, (b) concurrently with step (a), forming first images on first surfaces of a second plurality of forms from the image data for odd pages in the regular order, (c) stacking the second plurality of forms on said duplex tray, (d) feeding the forms stacked on said duplex tray from the top of the stack to said image forming unit, (e) forming second images on second surfaces of the second plurality of firms from the image data for even number pages stored in said memory in the reverse order, and (f) discharging the forms onto said paper discharged tray.

25. An image forming apparatus according to claim 24, wherein said controller further provides controls to perform the steps of:

determining whether a number of forms processed in one job exceeds an allowable number of forms stacked on said duplex tray;

feeding all of the allowable number of forms stacked on the duplex tray to said image forming unit;

forming the second images on the allowable number of forms from the image data;

discharging the forms onto said paper discharge tray; and inserting a form for job separation when a remaining job is restarted.

26. An image forming apparatus according to claim 24, wherein said controller further provides controls to perform the steps of:

determining whether a number of forms processed in one job exceeds an allowable number of forms stacked in said duplex tray;

feeding all the forms stacked on said duplex tray within the allowable number of sheets to said image forming unit;

forming the second images on all the forms from the image data;

discharging the forms with the images formed thereon onto said paper discharge tray; and when a remaining job is restarted, shifting the forms discharged onto said paper discharge tray by the allowable number of sheets.

27. An image forming apparatus according to claim 24, wherein the step of storing said image data for even pages in said memory includes the step of storing the image data for the even pages in said memory with an intermediate page data format requiring a smaller quantity of data.

28. An image forming apparatus according to claim 24, wherein the step of storing the image data for even pages in said memory includes the step of storing the image data for even pages in said memory with a page raster format.

29. An image forming apparatus according to claim 24, wherein the step of storing the image data for even pages in said memory includes the step storing the image data for even pages in a hard disk.

30. An image forming apparatus according to claim 24, wherein said controller further provides controls, when images are formed on duplex surfaces of each form, to perform the step of outputting the final page as a blank page when the first plurality is odd.

31. An image forming apparatus comprising:

an image forming unit for receiving image data for a first plurality of pages in a regular order and for forming an image on a surface of a form from image data for a page;

a duplex tray for holding a stack of forms each with an image formed on a first surface thereof by said image forming unit so that a second image formed on a second surface of each form by feeding forms sheet by sheet from the top of the stack to said image forming unit;

a paper discharge tray;

a memory for storing therein the image data; and a controller for providing controls so that, when an image is formed on a simplex surface of each form, to perform the steps of:

forming images on first surfaces of the first plurality of forms from the image data in the regular order, and discharging the forms onto said paper discharge tray;

wherein said controller, when images are formed on duplex surfaces of each form, further provides controls to perform the steps of:

(a) storing the image data for all pages in said memory, (b) forming first images on first surfaces of a second plurality of forms from the image data for even number pages stored in said memory in the reverse order, (c) stacking the forms on said duplex tray, (d) feeding the forms stacked on said duplex tray from the top of the stack to said image forming unit, (e) forming second images on second surfaces of the second plurality of forms from the image data for odd number pages stored in said memory in the regular order, and (f) discharging the forms onto said paper discharge tray.

32. An image forming apparatus according to claim 31, wherein said controller, when images are formed on duplex surfaces of each form, further provides signals for performing the steps of:

determining whether a number of forms to be processed in one job exceeds an allowable number of sheets for said duplex tray; and performing steps (b)–(f) in several substeps for each allowable number of forms, when it is determined that the number of forms to be processed in one job exceeds the allowable number of forms for said duplex tray.

33. An image forming apparatus according to claim 31, wherein said controller further provides controls to perform the steps of:

determining whether a number of forms processed in one job exceeds an allowable number of forms stacked on said duplex tray;

feeding all of the allowable number of forms stacked on the duplex tray to said image forming unit;

forming the second images on the allowable number of forms from the image data;

discharging the forms onto said paper discharge tray; and inserting a form for job separation when a remaining job is restarted.

34. An image forming apparatus according to claim 31, wherein said controller further provides controls to perform the steps of:

determining whether a number of forms processed in one job exceeds an allowable number of forms stacked in said duplex tray;

feeding all the forms stacked on said duplex tray within the allowable number of sheets to said image forming unit;

forming the second images on all the forms from the image data;

discharging the forms with the images formed thereon onto said paper discharge tray; and when a remaining job is restarted, shifting the forms discharged onto said paper discharge tray by the allowable number of sheets.

35. An image forming apparatus according to claim 31, wherein the step of storing said image data for all pages in said memory includes the step of storing the image data for all pages in said memory with an intermediate page data format requiring a smaller quantity of data.

36. An image forming apparatus according to claim 31, wherein the step of storing the image data for all pages in said memory includes the step of storing the image data for all pages in said memory with a page raster format.

37. An image forming apparatus according to claim 31, wherein the step of storing the image data for all pages in said memory includes the step storing the image data for all pages in a hard disk.

38. An image forming apparatus according to claim 31, wherein said controller further provides controls, when images are formed on duplex surfaces of each form, to perform the step of outputting the final page as a blank page when the first plurality is odd.

39. A method of controlling an image forming apparatus to form images on forms, said apparatus operating in one of a simplex mode and a duplex mode, comprising the steps of:

when operating in the duplex mode, (a) forming first images on first surfaces of the forms in a first order for stacking onto a duplex tray, and (b) forming second images on other second surfaces of the forms in a second order, reverse of the first order, from the duplex tray for discharging onto a paper discharge tray; and when operating in the simplex mode, forming third images on simplex surfaces of the forms in the first order for discharging onto the paper discharge tray.

40. A method according to claim 39, wherein:

step (a) includes forming the first images on the first surfaces of the forms in a regular order; and step (b) includes forming the second images on the other second surfaces of the forms in a reverse order.

41. A method according to claim 39, wherein:

step (a) includes forming the first images on the first surfaces of the forms in a reverse order; and step (b) includes forming the second images on the other second surfaces of the forms in a regular order.

42. A method of controlling an image forming apparatus to form images on a plurality of forms, said apparatus operating in one of a simplex mode and a duplex mode, when said apparatus is operating in a duplex mode, comprising the steps of:

(a) storing image data only for pages of a first parity in a memory;

(b) concurrently with step (a), forming first images on first surfaces of the plurality of forms from the image data for forms of a second parity, opposite to the first parity, in a regular order for stacking onto a duplex tray; and (c) forming second images on other second surfaces of the plurality of forms from the image data for the pages of the first parity stored in the memory in a reverse order from the duplex tray for discharging onto a paper discharge tray.

43. A method according to claim 42, wherein:

step (a) includes the step of storing image data only for odd pages in the memory; and step (b) includes the step of forming the first images on the first surfaces of the plurality of forms from the image data for even forms in the regular order.

44. A method according to claim 42, wherein:

step (a) includes the step of storing image data only for even pages in the memory; and step (b) includes the step of forming the first images on the first surfaces of the plurality of forms from the image data for odd forms in the regular order.

* * * * *